US009823788B2

(12) United States Patent
Qin

(10) Patent No.: US 9,823,788 B2
(45) Date of Patent: Nov. 21, 2017

(54) CAPACITIVE IN-CELL TOUCH PANEL, DISPLAY DEVICE, AND DRIVING METHOD

(71) Applicant: BOE TECHNOLOGY GROUP CO., LTD., Beijing (CN)

(72) Inventor: Wei Qin, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/435,548

(22) PCT Filed: Sep. 3, 2014

(86) PCT No.: PCT/CN2014/085840
§ 371 (c)(1),
(2) Date: Apr. 14, 2015

(87) PCT Pub. No.: WO2015/180286
PCT Pub. Date: Dec. 3, 2015

(65) Prior Publication Data
US 2015/0346860 A1  Dec. 3, 2015

(30) Foreign Application Priority Data

May 28, 2014 (CN) .......................... 2014 1 0231742

(51) Int. Cl.
G06F 3/042   (2006.01)
G06F 3/044   (2006.01)
G06F 3/041   (2006.01)

(52) U.S. Cl.
CPC ............ G06F 3/044 (2013.01); G06F 3/0412 (2013.01); G06F 3/0416 (2013.01); *G06F 2203/04103* (2013.01)

(58) Field of Classification Search
CPC ...... G06F 3/0412; G06F 3/044; G06F 3/0416; G09G 2310/08; G09G 3/296
(Continued)

(56) References Cited

U.S. PATENT DOCUMENTS 8,487,903 B2    7/2013  Anno et al.
2007/0070047 A1*  3/2007  Jeon ....................... G06F 3/0412
                                                                345/173
(Continued)

FOREIGN PATENT DOCUMENTS

CN          103268178 A       8/2013
CN          103279237 A       9/2013
(Continued)

OTHER PUBLICATIONS

International Search Report of the International Searching Authority for PCT/CN2014/085840 with Notice of Transmittal of the International Search Report dated Jan. 28, 2015 in Chinese.
(Continued)

*Primary Examiner* — William Boddie
*Assistant Examiner* — Alecia D English
(74) *Attorney, Agent, or Firm* — Collard & Roe, P.C.

(57) ABSTRACT

A capacitive in-cell touch panel, a display device and a driving method are provided. For the capacitive in-cell touch panel, at least one gate line (4) or at least one data line (5) is reused as a first touch sensing electrode, a plurality of mutually independent common electrodes (6) are disposed to intersect the first touch sensing electrode, and at least one common electrode (6) is reused as a second touch sensing electrode. The capacitive in-cell touch panel can reduce the number of masking in the manufacturing process, reduce the thickness of the touch panel and reduce the production cost. In the driving process of the touch panel, certain period is set aside of a frame of picture as touch period, that is, a time division driving mode is used for the touch time period and the display time period, it is also possible to avoid mutual interference between display signals and touch driving signals and in turn guarantee the quality of displayed picture and the touch accuracy.

13 Claims, 9 Drawing Sheets

(58) Field of Classification Search
USPC .................................................. 345/96, 173
See application file for complete search history.

(56) References Cited

U.S. PATENT DOCUMENTS

| | | | | |
|---|---|---|---|---|
| 2013/0021289 | A1* | 1/2013 | Chen | G06F 1/1601 345/174 |
| 2013/0335367 | A1* | 12/2013 | Kim | G09G 3/3696 345/174 |
| 2014/0015770 | A1* | 1/2014 | Lee | G06F 3/041 345/173 |
| 2014/0146246 | A1 | 5/2014 | Ma et al. | |
| 2014/0184944 | A1 | 7/2014 | Ma et al. | |
| 2014/0354572 | A1 | 12/2014 | Zhao et al. | |
| 2015/0084911 | A1* | 3/2015 | Stronks | G06F 3/044 345/174 |
| 2016/0041438 | A1* | 2/2016 | Hu | G09G 3/3648 345/174 |

FOREIGN PATENT DOCUMENTS

| | | |
|---|---|---|
| CN | 103309534 A | 9/2013 |
| CN | 103472966 A | 12/2013 |
| CN | 203480490 U | 3/2014 |
| CN | 203849723 U | 9/2014 |
| JP | 4732376 B2 | 7/2011 |
| KR | 10-2013-0074975 A | 7/2013 |

OTHER PUBLICATIONS

Written Opinion of the International Searching Authority for PCT/CN2014/085840, dated Jan. 28, 2015 in Chinese with an English translation.

Chinese Office Action of Chinese Application No. 201410231742.5, dated Dec. 31, 2014 with English translation.

* cited by examiner

CAPACITIVE IN-CELL TOUCH PANEL, DISPLAY DEVICE, AND DRIVING METHOD

CROSS REFERENCE TO RELATED APPLICATIONS

This application is the National Stage of PCT/CN2014/085840 filed on Sep. 3, 2014, which claims priority under 35 U.S.C. §119 of Chinese Application No. 201410231742.5 filed on May 28, 2014, the disclosure of which is incorporated by reference.

TECHNICAL FIELD

Embodiments of the present invention relate to a capacitive in-cell touch panel, a display device and a driving method.

BACKGROUND

According to their constructions, touch panels may be classified into add-on touch panels, on-cell touch panels and in-cell touch panels. For an in-cell touch panel, touch electrodes of the touch panel are disposed inside the liquid crystal display, which can reduce the overall thickness of the assembly, and also drastically reduce the manufacturing costs of the touch panel. According to the operation principles, touch panels may be classified into resistive touch panels and capacitive touch panels. Capacitive touch panel supports multipoint touch function, has high light transmittance and low overall power consumption, high touch surface stiffness and long service life.

At present, a capacitive in-cell touch panel is implemented by directly adding touch scan lines and touch sensing lines on the array substrate, that is, two layers of strip electrodes crossing each other in different planes are manufactured on the surface of the array substrate, serving as touch driving lines and touch sensing lines of the touch panel respectively and mutual capacitance is generated at intersections of two electrodes in different planes. It operation process is as follows: the voltage signals coupled out by touch sensing lines via mutual capacitance are detected when touch driving signals are applied to electrodes serving as touch driving lines. In this process, when a human body such as a finger contacts the touch panel, since the human body is a conductor, coupling capacitance is generated between an electrode as a touch driving line and an electrode as a touch sensing line, which acts on the mutual capacitance to change the capacitance value of the mutual capacitance near the touch point, and in turn changes the voltage signal coupled out by the touch sensing line. It is possible to determine the position of the touch point according to the change of the voltage signal.

SUMMARY

At least one embodiment of the present invention provides a capacitive in-cell touch panel and a display device to reduce the number of masking in the manufacturing process, reduce the thickness of the touch panel and avoid mutual interference between touch driving signals and display signals.

At least one embodiment of the present invention provides a capacitive in-cell touch panel including: an array substrate having gate lines and data lines, an opposed substrate disposed opposite to the array substrate, and a common electrode layer on a side of the opposed substrate that faces the array substrate or a side of the array substrate that faces the opposed substrate; wherein at least one of the gate lines or at least one of the data lines is reused as a first touch sensing electrode; the common electrode layer comprises a plurality of common electrodes disposed to intersect and independent from the first touch sensing electrode, and at least one of the common electrodes is reused as a second touch sensing electrode; in a touch time period, touch driving signals are applied to the first touch sensing electrode, and the second touch sensing electrode couples and outputs voltage signals of the touch driving signals; or, touch driving signals are applied to the second touch sensing electrode, and the first touch sensing electrode couples and outputs voltage signals of the touch driving signals.

At least one embodiment of the present invention further provides a display device including the above-mentioned capacitive in-cell touch panel provided in at least one embodiment of the present invention.

At least one embodiment of the present invention further provides a driving method for a touch panel including: an array substrate having gate lines and data lines, an opposed substrate disposed opposite to the array substrate, and a common electrode layer on a side of the opposed substrate that faces the array substrate or a side of the array substrate that faces the opposed substrate, the common electrode layer consisting of a plurality of common electrodes disposed to intersect and independently from the first touch sensing electrode; the method including: reusing at least one of the gate lines or at least one of the data lines as a first touch sensing electrode; reusing at least one of the common electrodes as a second touch sensing electrode; in a switch process of a frame of picture, in a touch time period, applying touch driving signals to the first touch sensing electrode, and coupling and outputting voltage signals of the touch driving signals by the second touch sensing electrode; or, applying touch driving signals to the second touch sensing electrode, and coupling and outputting voltage signals of the touch driving signals by the first touch sensing electrode.

BRIEF DESCRIPTION OF DRAWINGS

In order to explain the technical solution of embodiments of the present invention more clearly, accompanying drawings of the embodiments will be introduced briefly below. Obviously, the accompanying drawings in the following description only relate to some embodiments of the present invention rather than limiting the present invention.

DETAIL DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

The inventor of the present application have noted that in the structure design of a capacitive in-cell touch panel, since touch scan lines and touch sensing lines are added on the array substrate, which increases the number of masking in the manufacturing process, increase the thickness of the touch panel and thereby increase the production costs; and the touch driving signals applied on the added touch scan lines interfere with original display signals in the array substrate, thereby influencing the display quality of pictures and the accuracy of touch. Therefore, how to reduce the number of masking in the manufacturing process, reduce the thickness of the touch panel and avoid mutual interference between touch driving signals and display signals is a technical problem to be solved by those skilled in the art.

Figure 1A:
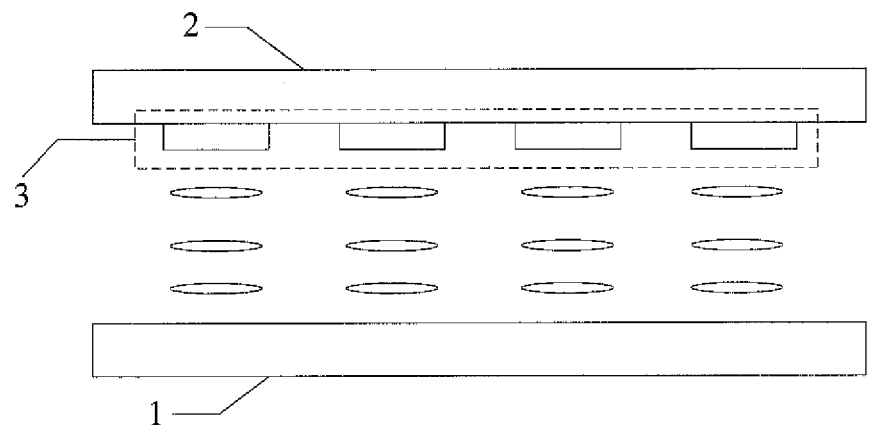
FIGS. 1a and 1b are side views of a capacitive in-cell touch panel provided in an embodiment of the present invention respectively.
Figure 1B:
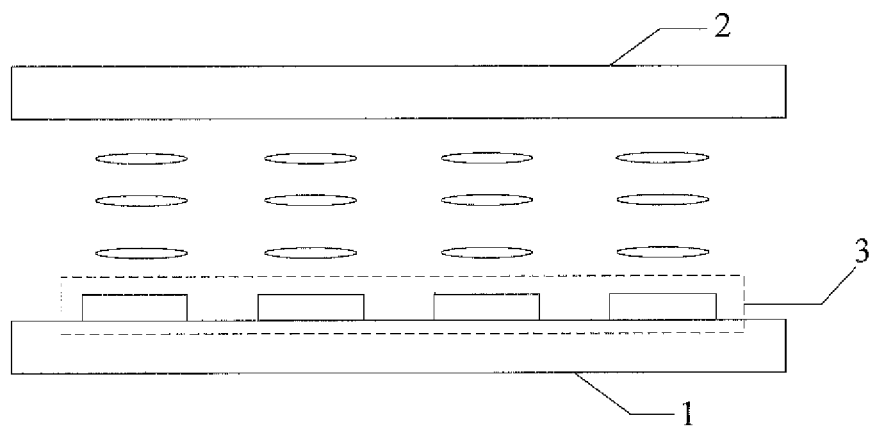

At least one embodiment of the present invention provides a capacitive in-cell touch panel as shown in FIGS. 1a and 1b, including: an array substrate 1 with gate lines and data lines, an opposed substrate 2 disposed opposite to the array substrate 1, and a common electrode layer 3 on one side of the opposed substrate 2 that faces the array substrate 1 (as shown in FIG. 1a) or on one side of the array substrate 1 that faces the opposed substrate 2 (as shown in FIG. 1b).

Figure 2A:
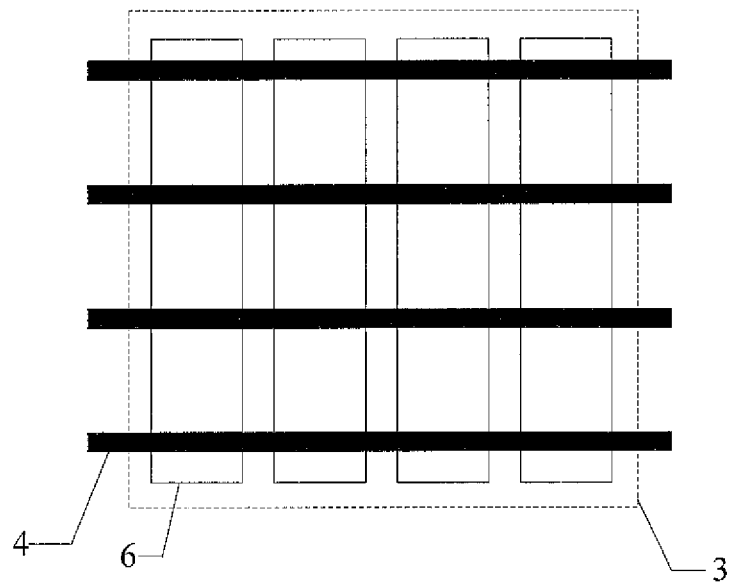
FIGS. 2a and 2b are top views of a capacitive in-cell touch panel provided in an embodiment of the present invention respectively.
Figure 2B:
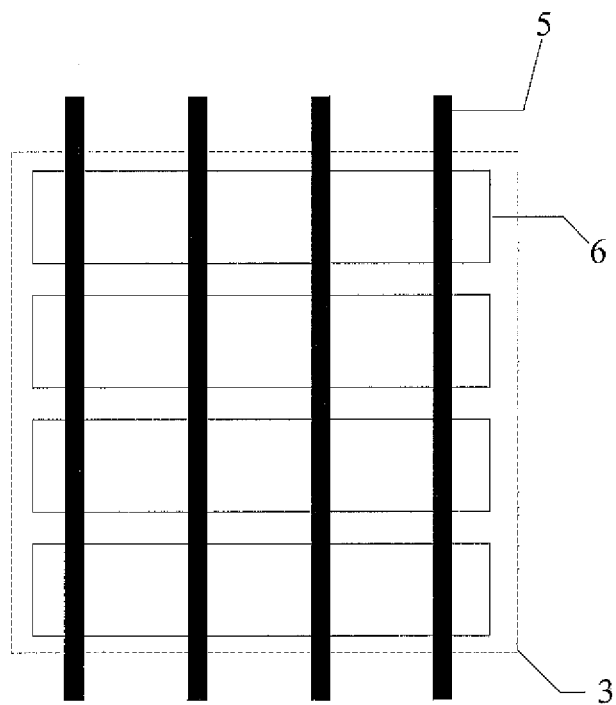

At least one gate line 4 (as shown in FIG. 2a) or at least one data line 5 (as shown in FIG. 2b) is reused (multiplexed) as a first touch sensing electrode.

The common electrode layer 3 comprises a plurality of common electrodes 6 disposed to cross and independently from the first touch sensing electrodes (FIGS. 2a and 2b show a common electrode layer 3 including 4 common electrodes 6 as an example), and at least one common electrode 6 is reused as a second touch sensing electrode.

In operation of the touch panel, in the switch process of a frame of picture, in the touch time period, touch driving signals are applied to first touch sensing electrodes, and second touch sensing electrodes couple and output the voltage signals of the touch driving signals. Alternatively, second touch sensing electrodes apply touch driving signals, and first touch sensing electrodes couple and output voltage signals of touch driving signals.

With the above-mentioned capacitive in-cell touch panel provided in at least one embodiment of the present invention, since at least one gate line 4 or at least one data line 5 is reused as a first touch sensing electrode, a plurality of common electrodes 6 and first touch sensing electrodes are mutually independent and disposed crossing each other, and at least one common electrode 6 is reused as a second touch sensing electrode, it is not required to add any new layer on the array substrate 1 to realize touch function, thereby reducing the number of masking in the manufacturing process, reducing the thickness of the touch panel and reducing the production costs. A certain period is set aside in the switch process of a frame of picture as touch period, that is, a time division driving mode is used for the touch time period and the display time period, it is also possible to avoid mutual interference between display signals and touch driving signals and in turn guarantee the quality of displayed picture and the touch accuracy.

As shown in FIG. 1a, the above-mentioned touch panel provided in at least one embodiment of the present invention may be applied to a twisted nematic (TN) liquid crystal display, that is, the common electrode layer 3 is on the side of the opposed substrate 2 that faces the array substrate 1. Alternatively, as shown in FIG. 1b, the above-mentioned touch panel provided in at least one embodiment of the present invention may also be applied to an advanced super dimension switched (ADS) liquid crystal display, that is, the common electrode layer 3 is on the side of the array substrate 1 that faces the opposed substrate 2, which is not limited herein.

Hereinafter, an example will be described in which the above-mentioned touch panel provided in at least one embodiment of the present invention is applied to an ADS liquid crystal display.

Upon specific implementation of the above-mentioned touch panel provided in at least one embodiment of the present invention, a plurality of common electrodes 6 and first touch sensing electrodes are mutually independent and disposed to cross each other, that is, the angle between common electrodes 6 and first touch sensing electrodes may be any angle greater than zero; at least one common electrode 6 is reused as a second touch sensing electrode, then the angle between the first touch sensing electrode and the second touch sensing electrode may be any angle greater than zero, which is not limited herein.

In at least one embodiment of the present invention, in order to enhance the touch sensitivity of the above-mentioned touch panel provided in the embodiment of the present invention and guarantee its touch accuracy, as shown in FIGS. 2a and 2b, it is possible to set the extension direction of the first touch sensing electrode to be perpendicular to the extension direction of the second touch sensing electrode.

As shown in FIG. 2a, while reusing at least one gate line 4 as the first touch sensing electrode, the extension direction of common electrodes 6 is perpendicular to the extension direction of gate lines 4. Alternatively, as shown in FIG. 2b, while reusing at least one data line 5 as the first touch sensing electrode, the extension direction of common electrodes 6 is perpendicular to the extension direction of data lines 5. In this way, it is not only possible to guarantee that the above-mentioned touch panel has favorable touch sensitivity and touch accuracy, but also to facilitate the manufacturing of the common electrode layer 3 in the manufacturing process of the above-mentioned touch panel, thereby simplifying the manufacturing process of the touch panel.

Figure 3A:
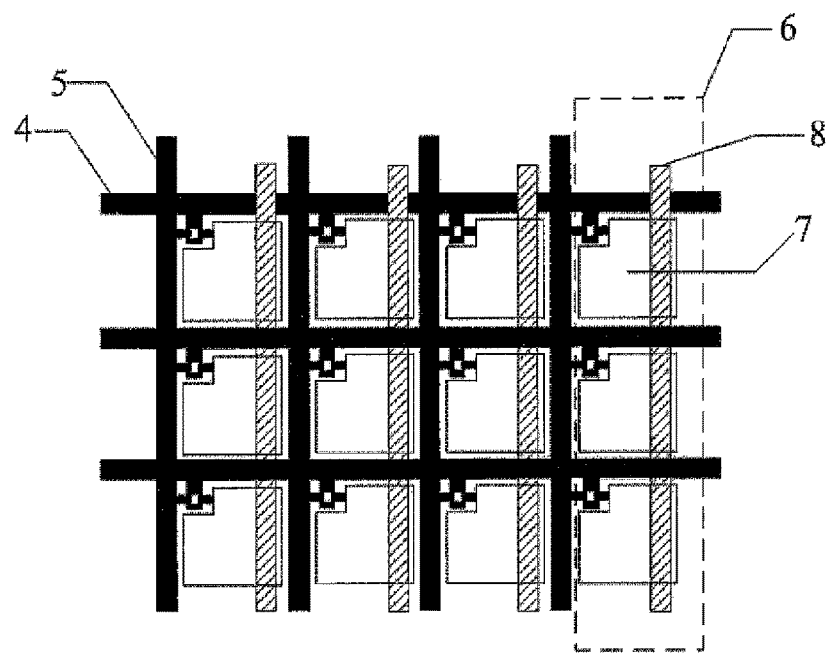
FIGS. 3a and 3b are top views of a capacitive in-cell touch panel provided in another embodiment of the present invention respectively.
Figure 3B:
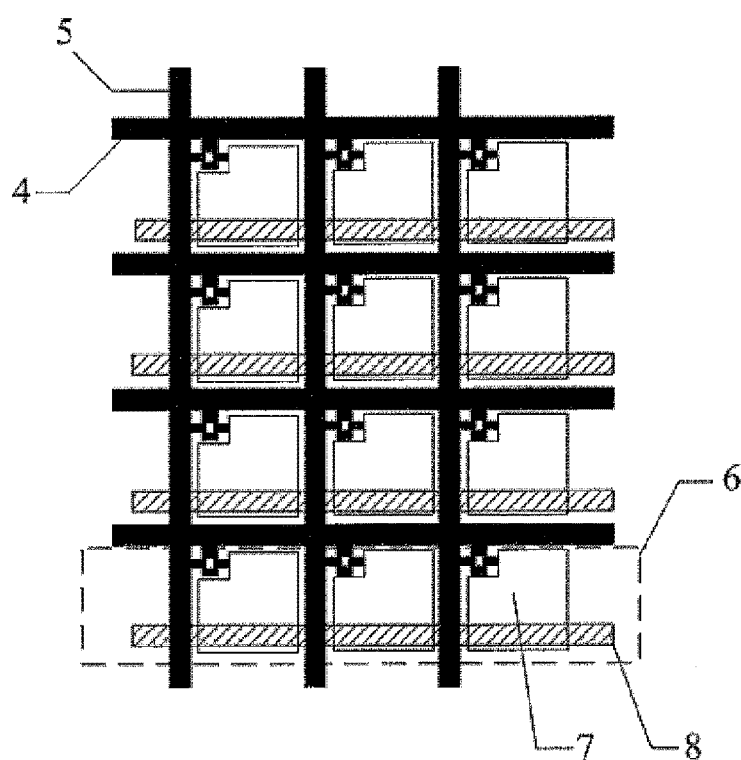

Upon specific implementation of the above-mentioned touch panel provided in at least one embodiment of the present invention, as shown in FIGS. 2a and 2b, common electrodes 6 may be strip electrodes. For example, in order to reduce the resistance of common electrodes 6, and thereby reducing attenuation of signals transmitted on common electrodes 6, as shown in FIGS. 3a and 3b, each common electrode 6 may include: a plurality of block common sub-electrodes 7 and a common electrode line 8 for electrically connecting common sub-electrodes 7 in the extension direction of common electrodes 6. Since the common electrode line 8 has a cross-sectional area significantly smaller than that of common electrodes 6, electrically connecting a plurality of block common sub-electrodes 7 by a common electrode line 8 can reduce the resistance of common electrodes 6, thereby reducing attenuation of signals transmitted on the common electrodes 6.

Furthermore, when orthogonal projections of block common sub-electrodes 7 and first touch sensing electrodes on the array substrate 1 have overlapping regions, overlapping regions between block common sub-electrodes 7 and first touch sensing electrodes generated direct mutual capacitance that may influence touch sensitivity of the touch panel. Therefore, in order to avoid the formation of direct mutual capacitances between block common sub-electrodes 7 and first touch sensing electrodes that influence touch sensitivity of the touch panel, in at least one embodiment of the present invention, it is possible to set common sub-electrodes 7 and first touch sensing electrodes such that their orthogonal projections on the array substrate 1 do not overlap each other. As shown in FIG. 3*a*, when at least one gate line 4 is reused as a first touch sensing electrode, it is possible to set common sub-electrodes 7 and the gate lines 4 reused as first touch sensing electrodes such that their orthogonal projections on the array substrate 1 do not overlap each other. As shown in FIG. 3*b*, when at least one data line 5 is reused as a first touch sensing electrode, it is possible to set common sub-electrodes 7 and the data lines 5 reused as first touch sensing electrodes such that their orthogonal projections on the array substrate 1 do not overlap each other. Particularly, the touch panel with the structure as shown in FIGS. 3*a* and 3*b* is particularly applicable to large size display devices such as notebook computers or desktop displays.

Upon implementation of the above-mentioned touch panel provided in at least one embodiment of the present invention, in the display time period of a frame of picture, gate lines 4 are applied with gate scanning signals line by line respectively to control thin film transistors connected with gate lines 4 in turn to be in on-state, thereby implementing pixel display. For example, when at least one gate line 4 is reused as the first touch sensing electrode, it is possible to set the polarity of the touch driving signal applied in the touch time period of a frame of picture to be opposite to the polarity of the gate scanning signal applied to gate lines 4 in the display time period. In this way, in the touch time period, it is possible to allow the thin film transistor connected with gate line 4 and data line 5 to be in an off state, thereby preventing the touch panel from displaying pictures in the touch time period. Alternatively, when at least one data line 5 is reused as a first touch sensing electrode, it is possible to apply voltage signals with opposite polarities to gate lines 4 in touch time period and display time period respectively. In this way, in the touch time period, it is possible to allow the thin film transistor connected with gate line 4 and data line 5 to be in an off state, thereby preventing the touch panel from displaying pictures in the touch time period.

Figure 4A:
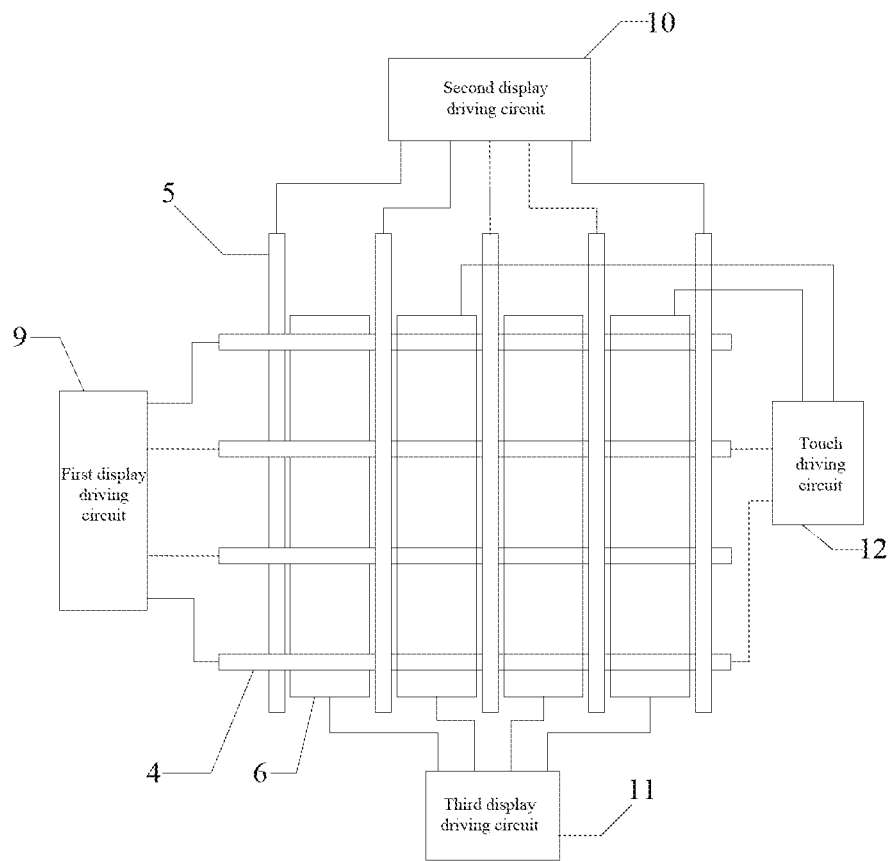
FIGS. 4a and 4b are structure diagrams of a driving circuit in a capacitive in-cell touch panel provided in an embodiment of the present invention respectively.
Figure 4B:
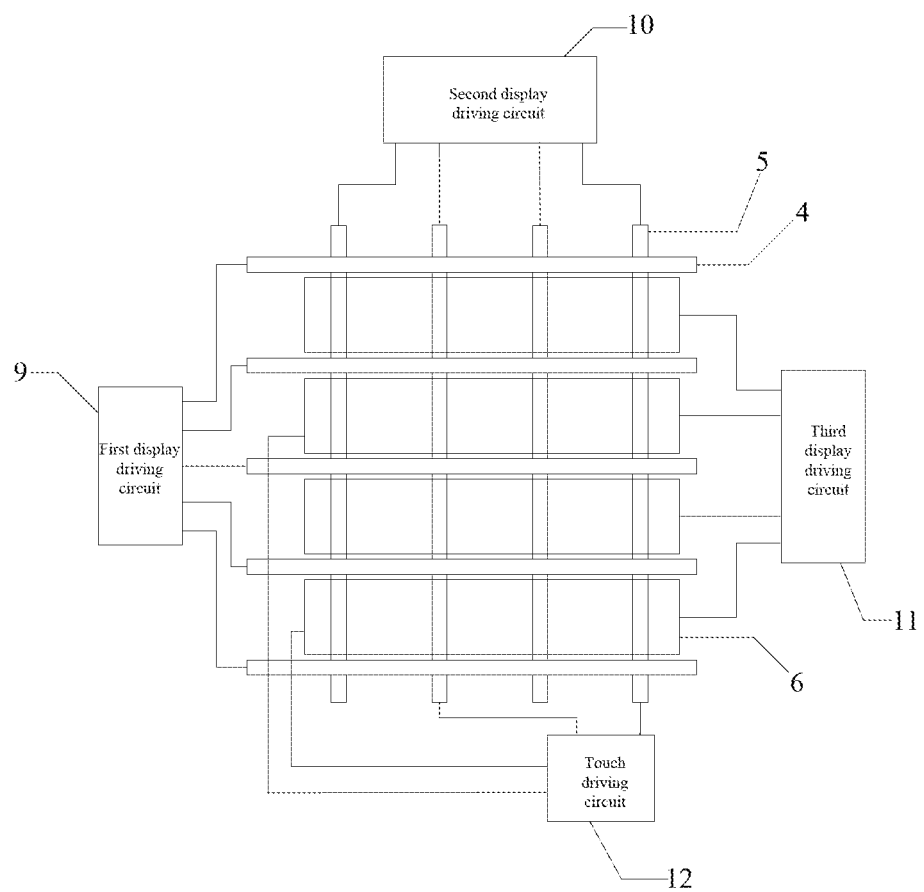

The above-mentioned touch panel provided in at least one embodiment of the present invention is described with respect to a touch panel with the structure shown in FIGS. 2*a* and 2*b* as an example. As shown in FIGS. 4*a* and 4*b*, it may further include a first display driving circuit 9 electrically connected with gate lines 4 and configured to apply gate scanning signals to gate lines 4; a second display driving circuit 10 electrically connected with data lines 5 and configured to apply gray scale signals to data lines 5; a third display driving circuit 11 electrically connected with common electrodes 6 and configured to apply common electrode voltage signals to common electrodes 6; and a touch driving circuit 12 electrically connected with first touch sensing electrodes and second touch sensing electrodes and configured to apply touch driving signals to first touch sensing electrodes and receive voltage signals of second touch sensing electrodes coupling touch driving signals, or apply touch driving signals to second touch sensing electrodes and receive voltage signals of first touch sensing electrodes coupling touch driving signals.

Figure 5A:
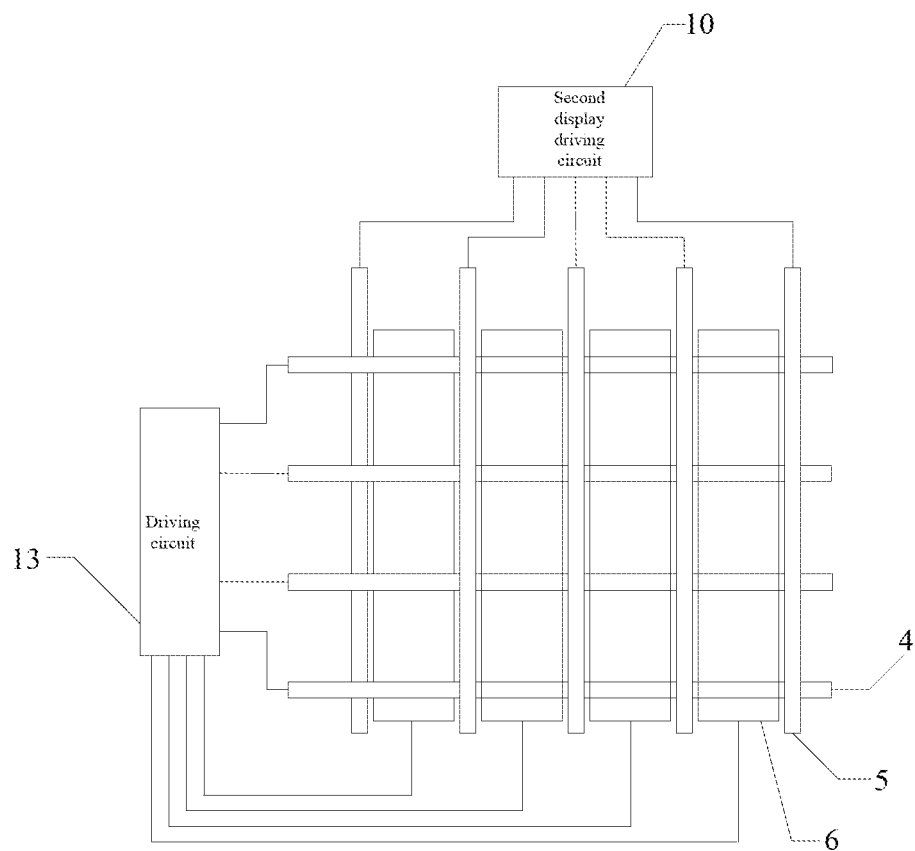
FIGS. 5a and 5b are structure diagrams of a driving circuit in a capacitive in-cell touch panels in embodiment I and II of the present invention respectively.

With the above-mentioned touch panel provided in the embodiment of the present invention, in order to simplify the manufacturing process of the touch panel and reduce the production cost, it is possible to integrate chips for display driving and chips for touch driving into one piece. Where at least one gate line 4 is reused as the first touch sensing electrode, the touch panel with the structure shown in FIG. 2*a* is described as an example. As shown in FIG. 5*a*, it is possible to set the first display driving circuit 9, the third display driving circuit 11 and the touch driving circuit 12 as one driving circuit 13. The driving circuit 13 may output different signals in different channels in the same time period. In the display time period of a frame of picture, the channels in the driving circuit 13 that correspond to gate lines 4 outputs gate scanning signals, and the channels corresponding to the common electrodes 6 outputs common electrode signals. In the touch time period of a frame of picture, the channels corresponding to the gate lines 4 output touch driving signals, the channels corresponding to common electrodes 6 couple and output voltage signals of the touch driving signals, or the channels corresponding to the common electrodes 6 output touch driving signals, and the channel corresponding to gate lines 4 couple and output voltage signals of the touch driving signals.

Figure 5B:
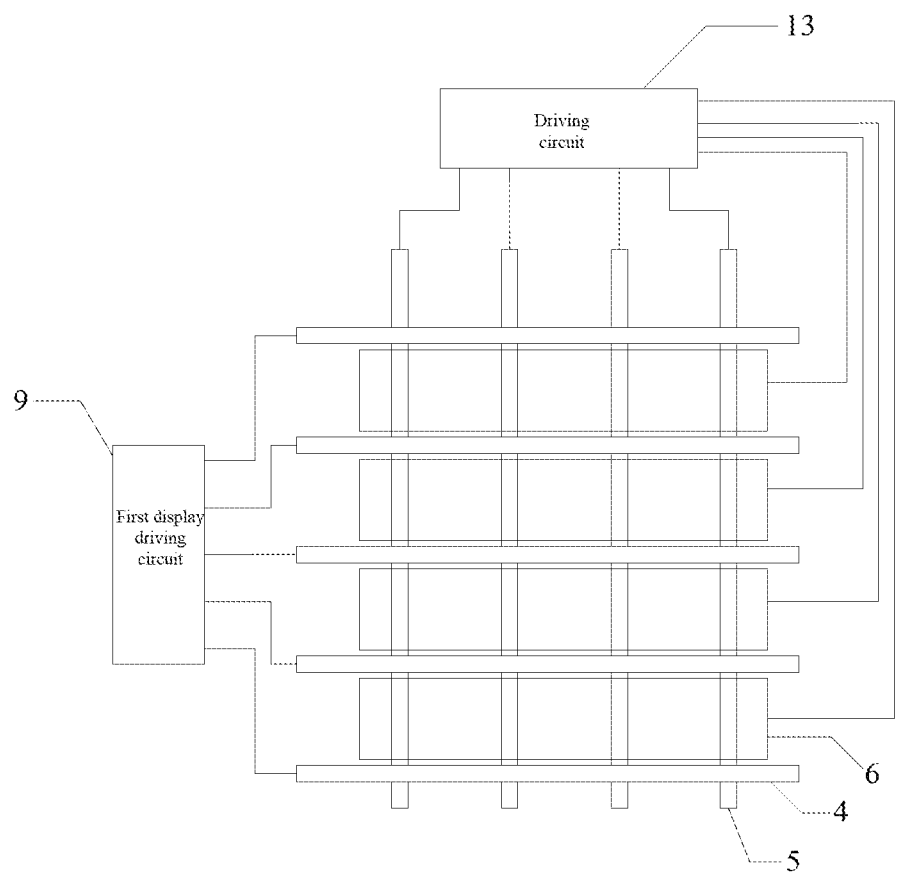

Or, where at least one data line 5 is reused as the first touch sensing electrode, the touch panel with the structure shown in FIG. 2*b* is described as an example. As shown in FIG. 5*b*, it is possible to set the second display driving circuit 10, the third display driving circuit 11 and the touch driving circuit 12 as one driving circuit 13. Similarly, the driving circuit 13 may output different signals in different channels in the same time period. In the display time period of a frame of picture, the channel in the driving circuit 13 that corresponds to data lines 5 outputs gray scale signals, and the channel corresponding to the common electrodes 6 outputs common electrode signals. In the touch time period of a frame of picture, the channel corresponding to the data lines 5 outputs touch driving signals, the channel corresponding to common electrodes 6 couples and outputs voltage signals of the touch driving signals, or the channel corresponding to the common electrodes 6 outputs touch driving signals, and the channel corresponding to data lines 5 couples and outputs voltage signals of the touch driving signals.

Hereinafter, the specific implementation for integrating chips for display driving and chips for touch driving into one piece in the above-mentioned touch panel provided in the embodiment of the present invention will be described in detail with respect to two specific examples.

Example I

The description is given below with respect to an example in which all gate lines 4 are reused as first touch sensing electrodes, all common electrodes 6 are reused as second touch sensing electrodes, and touch driving signals are applied to first touch sensing electrodes, second touch sensing electrodes couple and output voltage signals of touch driving signals.

Figure 6A:
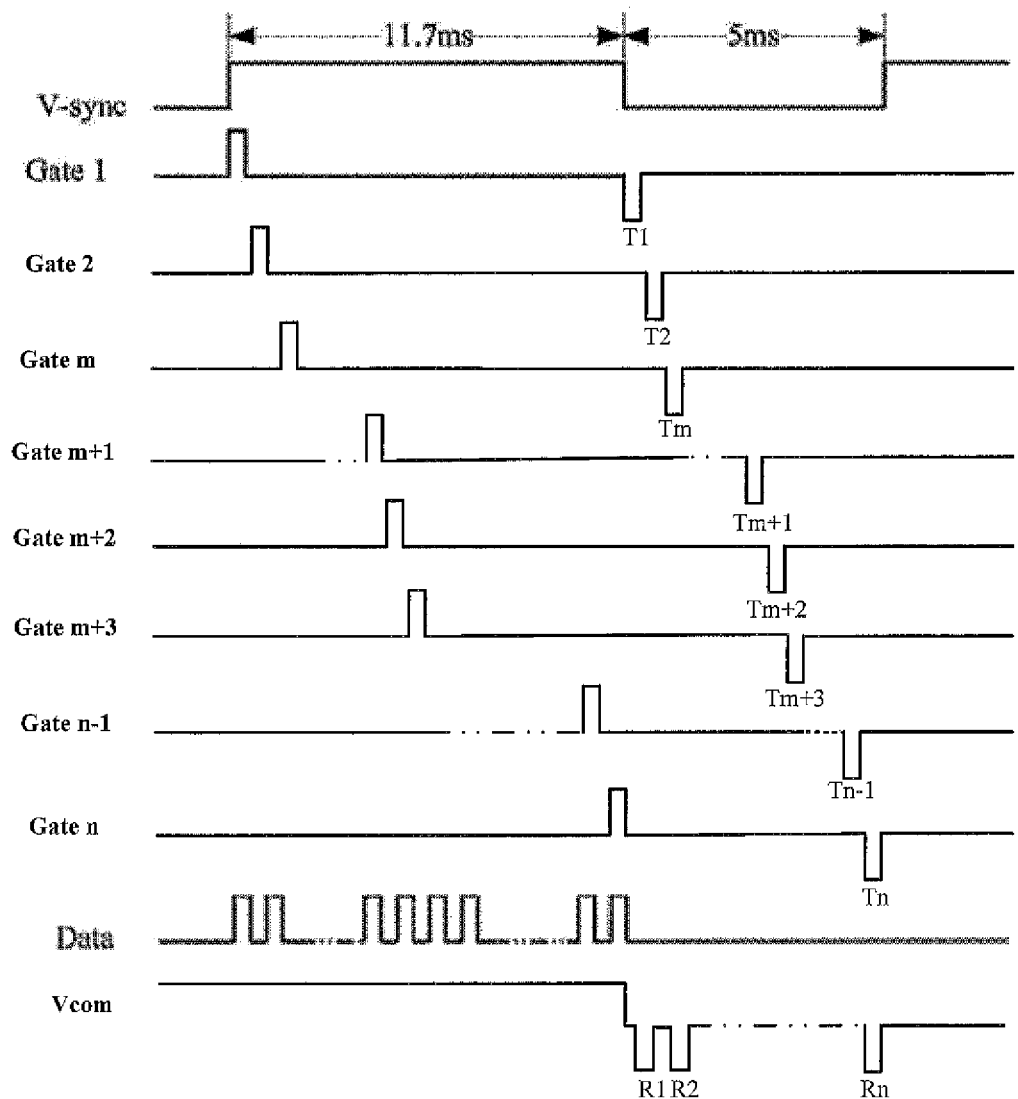
FIGS. 6a and 6b are driving timing diagrams of a driving circuit in capacitive in-cell touch panels in embodiment I and II of the present invention respectively.

The touch panel in this example corresponds to the driving timing diagram shown in FIG. 6*a*. The time period for the touch panel to display each frame (V-sync) is divided into a display time period and a touch time period. For example, in the driving timing diagram shown in FIG. 6*a*, the time period for the touch panel to display a frame is 16.7 milliseconds (ms), in which 5 ms is chosen as the touch time period and the remaining 11.7 ms is the display time period. Of course, it is also possible to properly adjust the durations of both according to the processing capacity of chips, which is not limited herein. In the display time period, the driving circuit 13 applies gate scanning signals to each gate line Gate 1, Gate 2, . . . , Gate n in the touch panel in turn and applies constant common electrode signals to common electrodes Vcom, and the second display driving circuit 10 applies gray scale signals to the data lines Data, thereby implementing liquid crystal display function. In the touch time period, the driving circuit 13 applies touch driving signals Tx (T1, T2, . . . , Tn) to gate lines Gate1, Gate2, . . . , Gate n serving as first touch sensing electrodes, and common electrodes Vcom serving as second touch sensing electrodes couple and output voltage signals Rx (R1, R2, . . . , Rn) of touch driving signals.

And, as shown in FIG. 6a, touch driving signals Tx (T1, T2, Tn) applied in the touch time period have opposite polarities to that of gate scanning signals applied to gate lines Gate 1, Gate 2, . . . , Gate n in turn in the display time period, that is, in the touch time period, touch driving signals Tx (T1, T2, . . . , Tn) applied to gate lines Gate 1, Gate 2, Gate n serving as first touch sensing electrodes have opposite polarities to that of the gate scanning signals applied to gate lines Gate 1, Gate 2, . . . , Gate n in turn in the display time period. In this way, it is possible to allow the thin film transistors connected with gate lines and data lines to be in an off state, thereby preventing the touch panel from displaying pictures in the touch time period and avoiding influence on display quality of the picture displayed by the touch panel.

Example II

The description is given below with respect to an example in which all data lines 5 are reused as first touch sensing electrodes, all common electrodes 6 are reused as second touch sensing electrodes, and touch driving signals are applied to first touch sensing electrodes, second touch sensing electrodes couple and output voltage signals of touch driving signals. As shown in FIG. 5b, the chip for display driving and the chip for touch driving are integrated into one piece, that is, the second display driving circuit 10, the third display driving circuit 11 and the touch driving circuit 12 are set as one driving circuit 13.

Figure 6B:
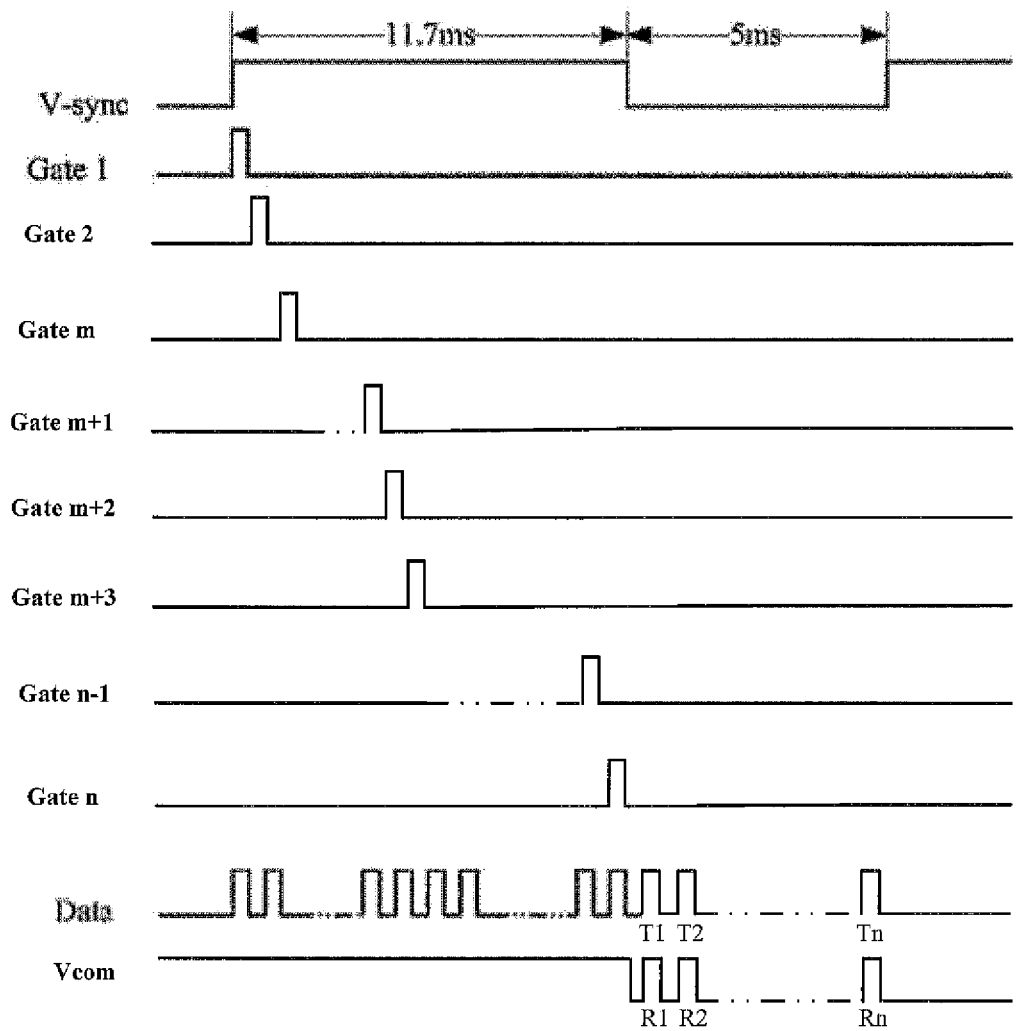

The touch panel in this example corresponds to the driving timing diagram shown in FIG. 6b. The time period for the touch panel to display each frame (V-sync) is divided into a display time period and a touch time period. For example, in the driving timing diagram shown in FIG. 6b, the time period for the touch panel to display a frame is 16.7 ms, in which 5 ms is chosen as the touch time period and the remaining 11.7 ms is the display time period. Of course, it is also possible to properly adjust the durations of both according to the processing capacity of chips, which is not limited herein. In the display time period, the first display driving circuit 9 applies gate scanning signals to each gate line Gate 1, Gate 2, . . . , Gate n in the touch panel in turn and the driving circuit 13 applies gray scale signals to the data lines Data and applies constant common electrode signals to the common electrodes Vcom, thereby implementing liquid crystal display function. In the touch time period, the driving circuit 13 applies touch driving signals Tx (T1, T2, . . . , Tn) to data lines Data serving as first touch sensing electrodes, and common electrodes Vcom serving as second touch sensing electrodes couple and output voltage signals Rx (R1, R2, . . . , Rn) of touch driving signals.

And, as shown in FIG. 6b, the first display driving circuit 9 applies gate scanning signals to gate lines Gate 1, Gate 2, . . . , Gate n in turn in the display time period, and applies zero voltage signals to gate lines Gate 1, Gate 2, . . . , Gate n in the touch time period. In this way, it is possible to allow the thin film transistors connected with gate lines and data lines to be in an off state, thereby preventing the touch panel from displaying pictures in the touch time period and avoiding influence on display quality of the picture displayed by the touch panel.

At least one embodiment of the present invention further provides a display device including the above-mentioned capacitive in-cell touch panel provided in at least one embodiment of the present invention. The display device may be any products or components with display function such as cell phones, flat computers, TV sets, displays, notebook computers, digital picture frames, and navigators. The embodiments of the above-mentioned capacitive in-cell touch panel may be referred to for the implementations of the display device, and repetitions will not be described any more herein.

With the capacitive in-cell touch panel and the display device provided in at least one embodiment of the present invention, since at least one gate line or at least one data line is reused as a first touch sensing electrode, a plurality of common electrodes and first touch sensing electrodes are mutually independent and disposed crossing each other, and at least one common electrode is reused as a second touch sensing electrode, it is not required to add any new layer on the array substrate to realize touch function, thereby reducing the number of masking in the manufacturing process, reducing the thickness of the touch panel and reducing the production costs. A certain period is set aside of a frame of picture as touch period, that is, a time division driving mode is used for the touch time period and the display time period, it is also possible to avoid mutual interference between display signals and touch driving signals and in turn guarantee the quality of displayed picture and the touch accuracy.

What are described above is related to the illustrative embodiments of the disclosure only and not limitative to the scope of the disclosure; the scopes of the disclosure are defined by the accompanying claims.

The present application claims priority of a China patent application No. 201410231742.5 filed on May 28, 2014, which is incorporated in its entirety herein by reference as part of the present application.

The invention claimed is:
1. A capacitive in-cell touch panel comprising: an array substrate having gate lines and data lines, an opposed substrate disposed opposite to the array substrate, and a common electrode layer on a side of the opposed substrate that faces the array substrate or a side of the array substrate that faces the opposed substrate;
wherein at least one of the gate lines is reused as a first touch sensing electrode;
wherein the common electrode layer comprises a plurality of common electrodes disposed to intersect and independent from the first touch sensing electrode, and at least one of the common electrodes is reused as a second touch sensing electrode;
wherein when touch sensing is performed,
touch driving signals are applied to the first touch sensing electrode, and a coupled voltage signal related to mutual capacitance between the first touch sensing electrode and the second touch sensing electrode is outputted from the second touch sensing electrode; or touch driving signals are applied to the second touch sensing electrode, and a coupled voltage signal related to mutual capacitance between the first touch sensing electrode and the second touch sensing electrode is outputted from the first touch sensing electrode;

wherein in response to at least one of the gate lines being reused as the first touch sensing electrode, the touch driving signals applied to the at least one of the gate lines when the touch sensing is performed and gate scanning signals applied to the at least one of the gate lines when displaying is performed have identical absolute voltage values but opposite polarities.

2. The touch screen of claim 1, wherein an extension direction of the first touch sensing electrode is perpendicular to that of the second touch sensing electrode.

3. The touch screen of claim 2, wherein each of the common electrodes comprises a plurality of block common sub-electrodes and a common electrode line for electrically connecting the common sub-electrodes along the extension direction of the common electrode.

4. The touch screen of claim 3, wherein the common sub-electrodes and the first touch sensing electrode do not overlap with each other along a normal direction of the array substrate.

5. The touch screen of claim 1, wherein each of the common electrodes comprises a plurality of block common sub-electrodes and a common electrode line for electrically connecting the common sub-electrodes along the extension direction of the common electrode.

6. The touch screen of claim 5, wherein the common sub-electrodes and the first touch sensing electrode do not overlap with each other along a normal direction of the array substrate.

7. The touch panel of claim 5, further comprising:
a first display driving circuit electrically connected with the gate lines and configured to apply gate scanning signals to the gate lines;
a second display driving circuit electrically connected with the data lines and configured to apply gray scale signals to the data lines; and
a third display driving circuit electrically connected with the common electrodes and configured to apply common electrode voltage signals to the common electrodes.

8. The touch panel of claim 7, further comprising:
a touch driving circuit electrically connected with the first touch sensing electrode and the second touch sensing electrode and configured to apply the touch driving signals to the first touch sensing electrode and receive the coupled voltage signal from the second touch sensing electrode, or apply the touch driving signals to the second touch sensing electrode and receive the coupled voltage signal from the first touch sensing electrode.

9. The touch screen of claim 8, wherein
where at least one of the gate lines is reused as a first touch sensing electrode, the first display driving circuit, the third display driving circuit and the touch driving circuit are one driving circuit.

10. The touch panel of claim 1, further comprising:
a first display driving circuit electrically connected with the gate lines and configured to apply gate scanning signals to the gate lines;
a second display driving circuit electrically connected with the data lines and configured to apply gray scale signals to the data lines; and
a third display driving circuit electrically connected with the common electrodes and configured to apply common electrode voltage signals to the common electrodes.

11. The touch panel of claim 10, further comprising:
a touch driving circuit electrically connected with the first touch sensing electrode and the second touch sensing electrode and configured to apply the touch driving signals to the first touch sensing electrode and receive the coupled voltage signal from the second touch sensing electrode, or apply the touch driving signals to the second touch sensing electrode and receive the couple voltage signal from the first touch sensing electrode.

12. A display device comprising the capacitive in-cell touch panel of claim 1.

13. A driving method for a touch panel, the touch panel comprising: an array substrate having gate lines and data lines, an opposed substrate disposed opposite to the array substrate, and a common electrode layer on a side of the opposed substrate that faces the array substrate or a side of the array substrate that faces the opposed substrate, the common electrode layer consisting of a plurality of common electrodes disposed to intersect and independently from the first touch sensing electrode; the method comprising:
reusing at least one of the gate lines as a first touch sensing electrode;
reusing at least one of the common electrodes as a second touch sensing electrode;
when touch sensing is performed, applying touch driving signals to the first touch sensing electrode, and coupling voltage signals of the touch driving signals by the second touch sensing electrode and outputting the voltage signals of the touch driving signals; or, applying touch driving signals to the second touch sensing electrode, and coupling voltage signals of the touch driving signals by the first touch sensing electrode and outputting the voltage signals of the touch driving signals;
wherein in response to at least one of the gate lines being reused as the first touch sensing electrode, the touch driving signals applied to the at least one of the gate lines when the touch sensing is performed and gate scanning signals applied to the at least one of the gate lines when displaying is performed have identical absolute voltage values but opposite polarities.

* * * * *